Jan. 1, 1974  J. E. PIERSON ET AL  3,782,982
PRODUCTS PREPARED FROM SOLUBLE SILICATE SOLUTIONS
Filed June 12, 1970

INVENTORS.
Joseph E. Pierson
Stanley D. Stookey
BY
ATTORNEY

United States Patent Office 3,782,982
Patented Jan. 1, 1974

3,782,982
PRODUCTS PREPARED FROM SOLUBLE SILICATE SOLUTIONS
Joseph E. Pierson, Painted Post, and Stanley D. Stookey, Corning, N.Y., assignors to Corning Glass Works, Corning, N.Y.
Filed June 12, 1970, Ser. No. 45,806
Int. Cl. C04b 35/14
U.S. Cl. 106—75                    6 Claims

ABSTRACT OF THE DISCLOSURE

This invention relates to the discovery of a method for producing monolithic porous materials, water insoluble thermoplastic materials, and water soluble resinous materials containing silica ($SiO_2$) from reaction mixtures of soluble silicates and certain organic compounds by treating said reaction mixtures at moderate temperatures to react the various species therein.

BACKGROUND OF THE INVENTION

Figure 1:
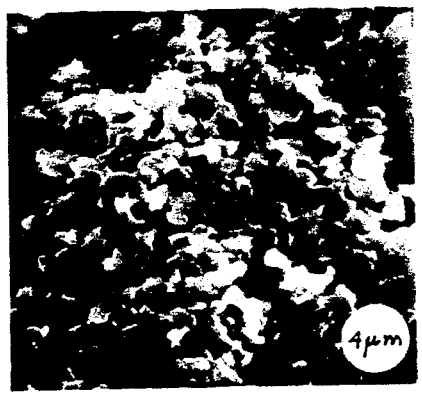
Figure 2:
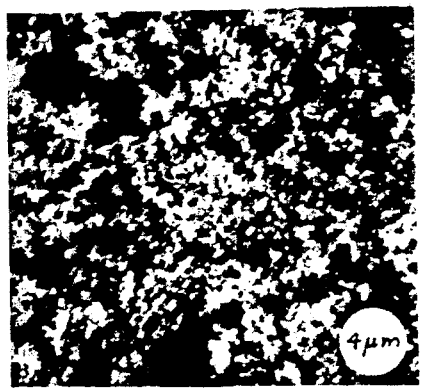

The processes and products of this invention have their genesis in the silicate solution chemistry art and are related in general terms with the silica gel art. However, although in the broad sense the processes and products of this invention are related to the aforementioned arts, the processes utilized in and products produced by this invention are not actually disclosed in, nor suggested by, those arts.

SUMMARY OF THE INVENTION

We have discovered that new and unique materials can be produced by the process we have discovered. This process requires the preparation of true solutions, colloidal solutions, or suspensions of soluble silicates with certain defined organic compounds. These solutions and/or suspensions must contain concentrations of silica greater than about 1 mole per liter in solution. Although it is desirable to have as much silica as possible in the solution, as a practical matter it is difficult to get more than about 12 moles per liter into solution. Since silica itself is insoluble in water, the silica is added in the form of a soluble silicate which is normally an inorganic alkali metal silicate or an organic ammonium silicate, preferably, a quaternary ammonium silicate such as is described in U.S. Pat. No. 3,239,521. The ratio of the alkali metal oxide or organic ammonium ion to silica can vary, but the amount of silica in solution must be at least 1 mole per liter. However, the concentration of alkali metal oxide or organic ammonium ion must at least be sufficient to produce a pH greater than about 10 with the preferred range of pH values varying between about 10–15.

To the soluble silicate solutions and/or suspensions, we add certain organic compounds, hereinafter discussed, which will be uniformly dissolved in the solution and which will react very slowly and uniformly throughout the solution to reduce the pH of the solution from greater than 10 to the range of about 7–9 and, in so doing, polymerize the silica. The desired concentration of the organic present in the solution is related to the alkali oxide and/or ammonium ion present. If the organic concentration is very high, unwanted instantaneous gelation of the solution can occur; or, on the other hand, if concentration is too low the desired products cannot be produced. With low concentrations of the organic, an increasingly soluble resinous material can be produced; where the solution is somewhat richer in the organic compound an insoluble thermoplastic material can be produced; and, as the ratio of the organic to the alkali oxide and/or organic ammonium ion is still further increased, a monolithic solid which is leachable in cold water to a porous silica body can be produced.

The solutions and/or suspensions of soluble silicate and organic compound are reacted by treating them at moderately low temperatures, viz, between the freezing point and boiling point of the particular solution, for a sufficient length of time to cause the reaction to occur. The reaction which occurs can be viewed as a phase separation; that is, the organic material reacts with the alkali oxide and/or ammonium ion so as to produce a less basic solution wherein the silica may then polymerize to form the desired product. After the reaction has taken place, the products described above are washed in water, acids, or other suitable solvents and then may be utilized for various purposes. In the case of the water-leachable monolithic solid, the body is washed so as to leach out the water soluble phases and thus leave a coherent, open-celled, porous silica article. The network which remains after leaching is essentially pure silica. It is believed that in the case of the lower organic concentrations or ratios there is not an adequate amount of the organic present to allow the reaction to proceed sufficiently to obtain the formation of a silica network.

The products formed from the lower concentrations of the organic can be useful as paint bases and as thermoplastic materials; whereas, the porous materials may be useful filters, absorbents, and insulators.

DESCRIPTION OF THE PREFERRED EMBODIMENT

The true solutions, colloidal solutions, or suspensions must have a concentration of at least about one mole of silica per liter in solution. If the concentration of silica is less than about one mole, the solution will be so void of silica as to result in a slush or undesirably weak body. As a matter of fact, we have learned that a silica concentration of at least three moles per liter in solution is much to be preferred to produce a body of reasonable strength with high porosity (a modulus of rupture of at least 100 p.s.i. as compared with modulus of rupture values between about 10–30 p.s.i.). Further, higher silica concentrations result in a more rapid reaction and essentially preclude the possibility of securing a slush-like material rather than a solid body. In general, it is desirable to have in solution as much silica as will be soluble at the reaction temperature. Depending upon the silicate chosen, silica may be present in concentrations up to 12 moles per liter. Furthermore, the maximum concentration of silica is dependent upon the maximum solubility of silica at the reaction temperature. It will be appreciated, of course, that the suspensions utilized may also have a high concentration of silica suspended in the water medium.

In order to provide a solution having silica therein, it is necessary to use various soluble silicate compounds as starting materials. Thus, we have found that sodium silicate, potassium silicate, quaternary ammonium silicate, and lithium silicate may be used. The various soluble silicates are soluble in different alkali metal oxide and/or quaternary ammonium ion-to-silica ratios. For example, sodium silicate is soluble in water in mole ratios up to about 4:1 silica-to-soda.

The concentration of alkali oxide or organic ammonium ion which is critical to this invention is determined as a function of the pH. Therefore, the pH of the solution must be at least 10. Nevertheless, if the alkali oxide or organic ammonium ion is in a concentration substantially greater than that necessary to produce the desired minimum pH, undesirable products can result. In the case of the porous body, in order to avoid unwanted soluble products, we maintain the pH below about 15.

To obtain the products of our invention, a compound is added to the solution and/or suspension which will react slowly and uniformly to reduce the pH of the solution so that silica may polymerize or phase separate in the solution. We believe organic compounds which will enter into a Cannizzaro-type of reaction are suitable; that reaction is characteristic of aldehydes without alpha-hydrogens in strongly alkaline solutions. We have found that organic compounds selected from the group consisting of formaldehyde, paraformaldehyde, formamide, glyoxal, and mixtures thereof, will react in such a manner as to relatively slowly reduce the pH of the solution and thereby allow polymerization of the silica under such conditions as to form the desired structure. In the case of formaldehyde, the reaction might be postulated to be as follows: two molecules of formaldehyde react with one molecule of sodium hydroxide in a self-oxidation and reduction reaction. In the case of formamide, one mole of formamide would react with one mole of sodium hydroxide to produce sodium formate, and the ammonium ion may displace an additional mole of sodium ion in the sodium silicate to form a silanol group and ammonia. The concentrations of the organic compound, except for formamide, which are necessary to produce the desired product are related to the mole ratio of formaldehyde, paraformaldehyde, and/or glyoxal with the alkali metal oxide and/or organic ammonium ion. Table I sets forth the products which can be obtained when there are different ratios of formaldehyde, paraformaldehyde, or glyoxal to alkali metal oxide and/or organic ammonium ion.

TABLE I

| Product: | Mole ratio |
|---|---|
| Clear brown viscous liquid to an opaque semisolid | 0.4–0.7 |
| An increasingly insoluble product | 0.7–1.1 |
| Insoluble thermoplastic | 1.1–2.0 |
| Leachable silicate solids | >2.0 |

Above a mole ratio of formaldehyde, glyoxal, and/or paraformaldehyde to alkali metal oxide and/or organic ammonium ion of about 2.0, a leachable monolithic silicate body can be obtained. Where higher mole ratios are utilized, excess organic compound is present which is normally innocuous but also unnecessary. However, it can be appreciated that two overall factors act to restrict the toal content of organic compound that can be employed. First, the solubility of the organic compound in water and, second, the dilution must not be so great as to reduce the $SiO_2$ concentration to below 1 mole per liter in solution. In general, we have found that mole ratios of formaldehyde, glyoxal, and/or paraformaldehyde to alkali metal oxide and/or organic ammonium ion between about 2–13 yield very satisfactory leachable monolithic silicate solids.

Experience has shown that formamide is more effective than the other three organic substances in that only one half of the concentration by weight or one-third the molar concentration will produce a similar final product. Thus, Table II reports the products which result with different mole ratios of formamide to alkali metal oxide and/or organic ammonium ion.

TABLE II

| Product: | Mole ratio |
|---|---|
| Clear brown viscous liquid to an opaque semisolid | 0.15–0.23 |
| An increasingly insoluble product | 0.23–0.37 |
| An insoluble thermoplastic | 0.37–0.67 |
| Leachable silicate solids | >0.67 |

A large excess of formamide can be tolerated, always bearing in mind the solubility of formamide in water and the need for at least one mole of silica per liter concentration. In general, however, mole ratios between 0.67–13 have been preferred.

To produce the products of our invention from the solutions, colloidal solutions, or suspensions, as prepared above, the mixtures thereof with the organic compound are treated at moderate temperatures, viz, between the freezing point and the boiling point of the particular solution. Of course, higher temperatures can be used at elevated pressures. However, we prefer to react our solutions at temperatures between 40° C. and 100° C. Depending upon the reactants and reaction temperatures, the time of the reaction can be between about a few seconds, say five seconds, and 720 hours. When the preferred reaction temperatures are utilized, times in excess of 24 hours have not shown any improvement in properties over shorter reaction periods. The size of the sample and heat transfer characteristics thereof, will to some extent determine the length of time required to uniformly heat the sample. In those solutions wherein the organic compound is present in concentrations less than that adequate to react with all of the alkali oxide and/or ammonium ion to sufficiently reduce the pH, the organic will react to the extent that it is available and the remaining product will be in a sense an incompletely polymerized body; however, where the organic compound is present in amounts equivalent to or greater than that which is sufficient to react with all the alkali oxide and/or ammonium ion, the product will have a completely polymerized silica network and there will remain an excess of the organic in the body. Normally, during the reaction step of this process there is some volume change between the volume of the solution and that of the final product. This change in volume decreases with increasing organic concentration and can approach zero. This factor will also be affected by the particular organic.

To prepare the solutions of our invention, we have generally used liquid formamide, particulate paraformaldehyde, and the commercially available soluble silicate, glyoxal, and formaldehyde solutions as set forth below in weight percent:

Lithium polysilicate—2.1% $Li_2O$, 20% $SiO_2$ and balance water

Sodium silicate—6.75% $Na_2O$, 25.3% $SiO_2$ and balance water

Potassium silicate—8.3% $K_2O$, 20.8% $SiO_2$ and balance water

Quaternary ammonium silicate—9.85% quaternary ammonium ion, 45% $SiO_2$ and balance water Formaldehyde—37% formaldehyde and 63% water Glyoxal—30% glyoxal and 70% water.

Our prime advantage of this invention is the ability to readily design shapes of high complexity therefrom with relative ease. Hence, since the reaction mixture can range from a relatively thin solution to a highly viscous suspension, bodies can be shaped therefrom by casting, drawing, pressing, rolling, or through any other forming technique, depending upon the configuration desired, by controlling the viscosity of the reaction mixture. Moreover, the leachable bodies are sufficiently strong to allow them to be machined to shape. Thus, they can be drilled, sawed, milled, etc. Further, various inert materials, e.g., reinforcing agents such as glass fibers, mica, silica powders, etc. can be incorporated in the reaction mixture to give the final product special properties.

As set forth in Table I, the truly water soluble resins are produced when the mole ratio of formaldehyde, paraformaldehyde, or glyoxal to alkali metal oxide and/or ammonium ion, is between 0.4 and 0.7 and the mole ratio of formamide-to-alkali metal oxide and/or ammonium ion is about 0.15–0.23. Preferably, these solutions contain between about 5% and 8% by weight formaldehyde.

Example I 100 cc. of the sodium silicate solution and 7 cc. of the formaldehyde solution were mixed so as to form a true solution of sodium silicate and formaldehyde. On the anhydrous basis, the solution contained 44.8 grams of formaldehyde and sodium silicate. Formaldehyde represented 5.7% by weight of the mixture and the sodium silicate constituted 94.3%. The solution was placed in a closed container and heated for 16 hours at 80° C. The resultant product was a solid from which the liquid fraction had been exuded. The solid had a weight of about 56.6 grams and a translucent amber appearance; whereas, the remaining liquid was a dark brown, watery material having a caramel-like odor. The solid material was believed to be a resin and when exposed to cold tap water, it was found that the solid uniformly dissolved therein.

Example II 100 cc. of the sodium silicate solution was mixed with 10 cc. of the formaldehyde solution. This mixture resulted in a solution containing on the anhydrous basis 45.9 grams of sodium silicate and formaldehyde. On a weight percent basis, the formaldehyde represented 8% and the sodium silicate 92% of the mixture. The solution was heated for 16 hours at 80° C. in a closed plastic container and the resultant product was a translucent amber solid weighing about 68.5 grams and a liquid of a dark brown, watery material having a caramel-like odor. The solid was found to dissolve in cold water but was somewhat less soluble than the solid produced in Example I.

Partially soluble resins can be produced when the formaldehyde, paraformaldehyde, or glyooxal to alkali and/or ammonium oxide, more particularly $Na_2O$, ratio is between about 0.7 and 1.1 and the mole ratio of formamide-to-alkali metal oxide and/or ammonium ion is about 0.23–0.37.

Example III 200 cc. of the sodium silicate solution described above was mixed with 22 cc. of the formaldehyde solution. This yielded a solution which, on the anhydrous basis, contained 92.55 grams of sodium silicate and formaldehyde. The weight percent of formaldehyde in the mixture was 8.5% and that of the sodium silicate was 91.5%. The solution was then heated for 16 hours at 80° C. in a closed container. The resultant solid product was found to weigh 132 grams and be a translucent amber while the liquid portion was again a watery dark brown material having a caramel-like odor.

Example IV

Another solution was prepared by mixing 100 cc. of the sodium silicate solution with 13.5 cc. of the formaldehyde solution. On an anhydrous basis, this yielded 47.2 grams of formaldehyde and sodium silicate. The formaldehyde represented 10.5% by weight of the mixture on the dry basis while the sodium silicate represented 89.5%. The mixture was heated for 16 hours at 80° C. and the resultant solid exhibited a translucent amber color and weighed about 65.3 grams. The liquid again was a dark brown, watery material with a caramel-like odor. It was found that the solid dissolved very slowly in cold water at the rate of about 1.0 gram per hour.

Insoluble thermoplastic materials can be produced from any solution, colloidal solution, or suspension wherein the mole ratio of formaldehyde, paraformaldehyde, or glyoxal to the alkali metal and/or quaternary ammonium ion in solution is between about 1.1 and 2.0 or the mole ratio of formamide to alkali metal oxide and/or ammonium ion is between about 0.37–0.67. The table below recites Examples 5–9 and teaches the mixtures and various weight percentages necessary to produce the insoluble thermoplastic materials. The mixtures were treated in like manner to Examples I through IV at 80° C. for about 16 hours after which the solid was quickly rinsed and superficially dried. In all of the Examples 5–9, the solid was found to be an opaque, buff colored material with spherical voids, while the liquid portion was again a watery, dark brown material having a caramel-like odor.

TABLE III

| Ex. No. | Sodium silicate solution, cc. | Formaldehyde solution, cc. | Dry weight of sodium silicate and formaldehyde | Weight percent— | |
|---|---|---|---|---|---|
| | | | | Sodium silicate | Formaldehyde |
| V | 100 | 19 | 49.2 | 86.0 | 14.0 |
| VI | 220 | 42 | 108.5 | 84.0 | 16.0 |
| VII | 100 | 24.5 | 51.3 | 82.5 | 17.5 |
| VIII | 200 | 50 | 102.9 | 84.1 | 18.6 |
| IX | 100 | 29 | 52.9 | 79.5 | 20.5 |

When the mole ratio of formaldehyde, paraformaldehyde, or glyoxal-to-alkali metal or quaternary ammonium ion is between about 2.0 and 13.0 and the molar ratio of formamide-to-alkali metal oxide and/or ammonium ion is between about 0.67–13, a porous silica material of preferred properties and ease of manufacture can be produced. The minimum ratio is related to that at which the insoluble thermoplastic begins to form whereas the maximum is related to the formation of a saturated solution at the reaction temperature which can result in instantaneous and uncontrolled gelation. The porous silica materials of our invention can be characterized as having open continuous pores and being rigid, self-supporting, and dimensionally stable. The pore diameters can range between about 100 A. to 20,000 A. and the distribution of pore sizes can be reasonably uniformly controlled. Moreover, the percent of total porosity can also be controlled within relatively narrow limits between about 30 and 90%. The network, itself, consists essentially of silica, with, in some instances, trace amounts of the various alkali metal oxides.

The porous silica product of our invention can be distinguished over the porous materials of the prior art from several points of view. One such product known to the art is the porous glass disclosed in U.S. Pat. No. 2,106,744. The important distinctions between the products of our invention and that of the patent is that our porous body is free of $B_2O_3$ and thus is essentially pure silica; furthermore, the body of our invention is a strong monolithic structure, whereas the bodies disclosed in the patent are weak and particulate.

Aerogels and xerogels have been disclosed in the prior art. A gel may be defined as a colloidal system of solid character in which the colloidal particles comprise a coherent structure, this structure being interpenetrated by a liquid consisting in kinetic units smaller than colloidal particles. If this liquid is eliminated by evaporation, the gel is termed a "xerogel." If the liquid phase is replaced by a gaseous phase in such a way as to avoid the shrinkage which occurs if the gel is dried directly from a liquid, the resulting gel is termed an "aerogel."

Such products are readily distinguishable from the articles of our invention in that xerogels shrink greatly during the drying step and water causes the collapse and destruction of aerogels. Also, our invention can produce strong articles of substantial size whereas aerogels and xerogels are commonly formed in small units.

The porous silica bodies as produced by our invention are made by preparing solutions, colloidal structures, and suspensions as described above and then reacting them with specfic organic compounds at temperatures between the freezing point and that temperature at which the solution will boil. However, we prefer to carry out the reactions between 40° and 100° C. This reaction produces a solid body which may be leached by passing water or some other suitable solvent such as an alcohol, ketone, or organic or inorganic acid through the body to remove the soluble phase. The leaching temperature and solvent may be varied somewhat to produce varying properties. Any of the bodies produced using soluble silicates may be leached. Furthermore, certain constituents may be volatilized. However, when the alkali metal silicates are used, alkali metal oxide does not volatilize whereas the quaternary ammonium ion will volatilize. Thus, if it is desired to remove all alkali metal oxide, leaching can be used, but if some is to be left in the body volatilization can be used.

The porous bodies can be reheated at various temperatures to produce a more uniform structure, the reason for the production of a more uniform structure being that the smaller pores will close and thereby leave a pore size distribution which is more uniform. However, reheating at temperatures to 1600° C., depending upon the purity of the silica structure, collapses the structure to form a dense solid body. Depending upon the purity and treatment, crystals may form in the structure. The principal properties which can be affected by the parameters set forth above are the pore sizes and their distribution, the porosity of the body, and the modulus of rupture of the body.

In general, we have found that pore size and total porosity of the body vary inversely with silica concentration in the original solution. That is, as the silica concentration increases, the size of the pores and the total porosity decrease. The alkali metal oxide and/or quaternary ammonium ions, themselves, are believed to have little, if any, effect on the total porosity or pore size. The primary role thereof is simply to provide a means for introducing and keeping silica in solution. The principal role of the organic is to react with the base and thus reduce the pH so the silica will polymerize. However, quite surprisingly, we have found that, commonly, the average pore size also decreases with increasing concentrations of the organic compound but total porosity of the body increases with increased concentrations of the organic compound in the starting mixture.

As noted earlier, formaldehyde, paraformaldehyde, and glyoxal are functional equivalents in lower concentrations, whereas only about ⅓ the molar concentrations of formamide is required to yield a similar final product. The examples set forth in Table IV below have maintained all parameters constant other than the concentrations of paraformaldehyde, glyoxal, or formamide. In other words, the paraformaldehyde-to-alkali metal oxide, glyoxal-to-alkali metal oxide, and formamide-to-alkali metal oxide ratios have been altered to indicate the effect of variations in the concentrations of paraformaldehyde and formamide.

The samples reported in Table IV were prepared by the slow addition of particulate paraformaldehyde, liquid formamide, or liquid glyoxal to the aqueous solution of alkali silicate at room temperature, with vigorous stirring by a magnetic stirrer. The mixture was then poured into a Nalgene™ plastic bottle equipped with a tight cover. The bottle was then immediately transferred to an electrically-fired oven and heated to 80°–90° C. for 16 hours. After cooling to room temperature, the solid cylindrical shape was removed from the bottle, sawed into ¼″ thick discs, and leached for 16 hours in running tap water. The discs were then air dried at 600° C. for 1 hour. The measurements of porosity and the other recited properties in Table IV were determined employing the conventional mercury impregnation technique.

TABLE IV

| Reaction mixture | Average pore diameter, microns | Porosity, percent | Displacement density, g./cm.³ |
|---|---|---|---|
| 11 g. paraformaldehyde plus 100 cc. sodium silicate | 1.48 | 68 | 0.727 |
| 13 g. paraformaldehyde plus 100 cc. sodium silicate | 0.69 | 63 | 0.698 |
| 15 g. paraformaldehyde plus 100 cc. sodium silicate | 0.51 | 70 | 0.592 |
| 24 g. paraformaldehyde plus 100 cc. sodium silicate | 0.48 | 78 | 0.439 |
| 32 g. paraformaldehyde plus 100 cc. sodium silicate | 0.28 | 79 | 0.413 |
| 8 g. paraformaldehyde plus 100 cc. potassium silicate | 1.46 | 56 | 0.890 |
| 16 g. paraformaldehyde plus 100 cc. potassium silicate | 0.47 | 83 | 0.319 |
| 10 cc. formamide plus 100 cc. potassium silicate | 0.48 | 78 | 0.547 |
| 15 cc. formamide plus 100 cc. potassium silicate | 0.34 | 79 | 0.441 |
| 20 cc. formamide plus 100 cc. potassium silicate | 0.32 | 80 | 0.335 |
| 15 cc. glyoxal plus 100 cc. sodium silicate | 1.26 | 75 | 0.368 |
| 20 cc. glyoxal plus 100 cc. sodium silicate | 0.35 | 82 | 0.325 |

The alkali metal oxide or organic ammonium ion concentration in the solution must be sufficient to give the desired pH. However, variations in the concentration of the alkali oxide and/or ammonium ion substantially above that necessary to produce a pH of 10 may yield a glassy, soluble, or nonporous body. It is believed that the maximum alkali oxide and/or ammonium ion concentration should be equivalent to that necessary to produce a pH not in excess of 15. Since the amount of silica available for the various soluble silicates varies, a continuous distribution of silica concentration can be obtained utilizing mixtures of various soluble silicates. This then can result in a distribution of pore sizes and total porosity. As mentioned before, the kind and quantity of the organic also has an effect on both total porosity and pore size. If we assume no shrinkage, the total porosity and pore size seem to be a function of silica alone. However, if there is shrinkage, then there appears to be an effect wherein both silica concentration and organic compound type and concentration affect the total porosity and pore size.

Table V shows that for varying silica concentrations, assuming no shrinkage, the pore size of the final product will vary. The products recited in Table V were prepared in a manner similar to that utilized in the samples reported in Table IV. Hence, 20 grams of particulate paraformaldehyde were slowly added to the stated aqueous solutions of alkali silicate and organic ammonium silicate at room temperature accompanied with vigorous stirring by a magnetic stirrer. The mixture was turned into a plastic bottle having a tight-fitting cap and cured at 85° C. for 16 hours. Upon cooling to room temperature, the solid cylindrical shape was removed from the bottle, sawed into ¼″ thick discs, and leached for 16 hours in running tap water. Finally, the discs were air dried for 1 hour at 600° C. The silica concentrations of the various reaction mixtures is expressed as moles $SiO_2$/liter of solution.

TABLE V

| Reaction mixture | Moles SiO₂ | Average pore diameter, microns |
|---|---|---|
| 20 cc. potassium silicate plus 80 cc. quaternary ammonium silicate | 9.28 | 0.0077 |
| 50 cc. potassium silicate plus 50 cc. quaternary ammonium silicate | 7.42 | 0.0278 |
| 60 cc. potassium silicate plus 40 cc. quaternary ammonium silicate | 6.80 | 0.0340 |
| 70 cc. potassium silicate plus 30 cc. quaternary ammonium silicate | 6.19 | 0.0574 |
| 80 cc. potassium silicate plus 20 cc. quaternary ammonium silicate | 5.57 | 0.0934 |
| 90 cc. potassium silicate plus 10 cc. quaternary ammonium silicate | 4.95 | 0.214 |
| 50 cc. sodium silicate plus 50 cc. quaternary ammonium silicate | 8.03 | 0.0318 |
| 60 cc. sodium silicate plus 40 cc. quaternary ammonium silicate | 7.55 | 0.0530 |
| 70 cc. sodium silicate plus 30 cc. quaternary ammonium silicate | 7.05 | 0.150 |
| 80 cc. sodium silicate plus 20 cc. quaternary ammonium silicate | 6.55 | 0.340 |
| 90 cc. sodium silicate plus 10 cc. quaternary ammonium silicate | 6.05 | 0.365 |

The ratio of alkali oxide and/or quaternary ammonium ion to silica present in the starting solution can vary; for example, sodium silicates can be present in mole ratios of 1:1 to 1:4. However, since it is generally desirable to have a maximum concentration of silica present in the solution, the silicate solution having the highest concentration of silica which can be obtained will usually be utilized. Thus, for most of our examples, the ratio of alkali ion-to-silica is as low as possible or, conversely, the silica is as high as possible. This statement should not be construed as precluding the use of alkali-silica ratios other than those disclosed herein so long as the solution requirements as to alkali concentrations as measured by pH, silica concentration, and organic-to-alkali oxide and/or ammonium ion ratios, are maintained.

The table below sets forth the empirical data for the use of various reagents. In the table below high silica-to-alkali ratios were used.

TABLE VI

| Limit | Constituent | Moles per liter |
|---|---|---|
| Formaldehyde or paraformaldehyde with sodium silicate | | |
| A | Na₂O | 1.5 |
| | SiO₂ | 4.9 |
| | Formaldehyde | 3.0 |
| B | Na₂O | 1.3 |
| | SiO₂ | 3.9 |
| | Formaldehyde | 8.7 |
| Formaldehyde or paraformaldehyde with potassium silicate | | |
| A | K₂O | 1.0 |
| | SiO₂ | 3.9 |
| | Formaldehyde | 3.0 |
| B | K₂O | 0.8 |
| | SiO₂ | 3.2 |
| | Formaldehyde | 8.7 |
| Formamide with sodium silicate | | |
| A | Na₂O | 1.5 |
| | SiO₂ | 5.0 |
| | Formaldehyde | 1.0 |
| B | Na₂O | 1.4 |
| | SiO₂ | 4.4 |
| | Formaldehyde | 3.7 |
| Formamide with potassium silicate | | |
| A | K₂O | 1.0 |
| | SiO₂ | 4.1 |
| | Formamide | 1.0 |
| B | K₂O | 0.9 |
| | SiO₂ | 3.6 |
| | Formamide | 3.7 |

During the reaction, we have found that there is little, if any, shrinkage of the solid as compared with the total volume of the original solution reacted. The effects of the reaction temperature and time have been studied. The reaction temperatures can vary from about the freezing point to about the boiling point of the particular solution. However, we prefer to react the bodies at temperatures between about 40° and 100° C. The variations in temperature will affect the rate at which the reaction will occur but not the properties of the body. Moreover, the reaction temperatures will inversely affect the reaction times; that is, as the reaction temperaures are decreased the times for substantial reaction will increase. However, it is not believed that the reaction temperatures or times will affect the end properties of the body so long as the reaction will take place at those temperatures. The reaction times, depending upon solution composition and reaction temperature, may be as long as 720 hours or as short as 5 seconds.

In order to produce the porous bodies, it is necessary to leach or remove the products which remain in the network. This may be done by leaching in various solvents or by heating to a relatively high temperature to burn out the remaining materials. The simplest technique is to pour cold running tap water over the body. This is effective but leaves some alkaline impurities. Furthermore, samples leached in this manner tend to absorb calcium or other impurities from the water. Leaching can be done successfully in hot water or in an extractor using distilled water. Also, nitric and hydrochloric acids have been successfully employed. Increased temperatures and times will increase the rates but not change the leaching itself. The volatile reaction products can be expelled from the silica network by heating to temperatures sufficiently high to cause the burn out thereof. For example, temperatures on the order of 600° C. will, in most cases, burn out the volatile products within the network but leave the network essentially unaffected.

The porous silica bodies can be heated to various temperatures up to that at which a solid glassy body is formed. As the body is heated, the smaller pores will collapse thus providing a more uniform pore size. As the body is continuously heated up to about 1600° C. the pores continue to collapse and shrink until a solid body of consolidated silica is produced. Thus, by starting with the porous body, particular heat treatments can produce controlled pore sizes and ultimately a fused body. Of course, if various alkalies are within the network they will affect the firing temperature by acting as a flux.

The following example illustrates the capability of producing a solid porous body where the concentration of silica in the initial reaction mixture is very low. Thus, 16 grams of particulate paraformaldehyde were slowly added to a solution composed of 100 cc. potassium silicate solution plus 150 cc. water at room temperature with vigorous stirring by a magnetic stirrer to yield a paraformaldehyde-to-K₂O mole ratio of about 12.1. The concentration of silica therein was about 1.7 moles/liter of solution. The mixture was thereafter poured into a plastic bottle having a tight-fitting top and cured in an electrically-heated oven at 85° C. for 16 hours. The bottle was then cooled to room temperature, the solid cylindrical shape removed therefrom and sawed into ¼″ thick discs. The discs were first leached in dilute nitric acid for two days and subsequently leached in distilled water for a week. Finally, the discs were air dried at 600° C. for one hour.

The monolithic porous articles produced by this invention can be impregnated by various techniques well-known to the art so as to produce bodies having a silica network and some other material distributed throughout the interstices thereof.

We claim:
1. A method for making monolithic porous silica-containing products which consists in the steps of:
(a) preparing at least one aqueous mixture selected from the group consisting of true solutions, colloidal solutions, and suspensions having a pH between about 10–15 and containing about 3–12 moles of SiO₂ per liter in solution from soluble silicate solutions selected from the group consisting of an organic ammonium silicate, alkali metal silicates, and mixtures thereof; and (b) reacting an organic compound therewith selected from the group consisting of formaldehyde, paraformaldehyde, and mixtures thereof at a temperature between the freezing point and the boiling point of the solution for a sufficient length of time to reduce the pH of said aqueous mixture below 10 and to polymerize the silica, said organic compound being present in such an amount that the mole ratio thereof to alkali metal and/or ammonium ion is about 2–13.

2. A method according to claim 1 wherein said organic ammonium silicate is a quaternary ammonium silicate.

3. A method according to claim 1 wherein said alkali metal silicates are selected from the group consisting of lithium silicate, sodium silicate, potassium silicate, and mixtures thereof.

4. A method according to claim 1 wherein the reaction temperature is between about 40°–100° C.

5. A method according to claim 1 wherein the time sufficient to reduce the pH below 10 and polymerize the $SiO_2$ ranges about 5 seconds to 24 hours.

6. A monolithic, porous, silica-containing material produced in accordance with claim 1.

References Cited
UNITED STATES PATENTS

| | | | |
|---|---|---|---|
| 1,832,752 | 11/1931 | Thoretz | 106—74 |
| 2,069,486 | 2/1937 | Tilden | 106—74 |
| 2,234,646 | 3/1941 | Humphries | 106—74 |
| 2,968,572 | 1/1961 | Peeler | 106—74 |
| 3,028,340 | 4/1962 | Gandon et al. | 106—38.35 |
| 3,306,756 | 2/1967 | Miller | 106—74 |

JAMES E. POER, Primary Examiner

UNITED STATES PATENT OFFICE
CERTIFICATE OF CORRECTION

Patent No. 3,782,982     Dated January 1, 1974

Inventor(s) Joseph E. Pierson and Stanley D. Stookey

It is certified that error appears in the above-identified patent and that said Letters Patent are hereby corrected as shown below:

Column 5, line 43, "glyooxal" should be -- glyoxal --.

Column 6, Table III, column heading "Dry Weight of sodium and silicate formaldehyde" should be -- Dry Weight of sodium silicate and formaldehyde --.

Column 9, Table VI, lines 61 and 64, "Formaldehyde" should be -- Formamide --.

Signed and sealed this 4th day of June 1974.

(SEAL)
Attest:

EDWARD M. FLETCHER, JR.
Attesting Officer

C. MARSHALL DANN
Commissioner of Patents